Dec. 11, 1951 R. H. LEE 2,578,254
CAMERA FILM TAKE-UP FOR AUTOMATIC EXPOSURE CAMERAS
Original Filed Oct. 9, 1946 2 SHEETS—SHEET 1

INVENTOR.
ROBERT H. LEE
BY
ATTY.

Dec. 11, 1951 R. H. LEE 2,578,254
CAMERA FILM TAKE-UP FOR AUTOMATIC EXPOSURE CAMERAS
Original Filed Oct. 9, 1946 2 SHEETS—SHEET 2

INVENTOR.
ROBERT H. LEE
BY
ATTY.

Patented Dec. 11, 1951

2,578,254

UNITED STATES PATENT OFFICE 2,578,254

CAMERA FILM TAKE-UP FOR AUTOMATIC EXPOSURE CAMERAS

Robert H. Lee, Indianapolis, Ind., assignor, by mesne assignments, to Micro Recording Company, a corporation of Florida Original application October 9, 1946, Serial No. 702,124. Divided and this application July 5, 1947, Serial No. 759,204

7 Claims. (Cl. 95—31)

My invention relates to control means for photographic cameras and primarily to means for controlling film advancing means of a camera, and particularly to film advancing means of a camera having means for automatically controlling the operation of the shutter.

More particularly, my invention relates to means for automatically advancing the film of a camera operating in combination with means for automatically timing the exposure of the object to be photographed by the camera.

My invention is particularly applicable to the control of cameras for making microfilm reproductions. In such cameras, due to the fact that the film or plate is so extremely small, the negative must be extremely sharp and accordingly, means must be provided for controlling the timing of the exposure of the negative to the object. The negative of such microfilm cameras consists of film suitably rolled upon a reel and a new film must be positioned in accordance with the requirements of the camera. In controlling the timing of the exposure, it is desirable to control the time of exposure in accordance with the amount of light reflected from the object to be photographed on the film. Some of the objects are comparatively light or have a comparatively light background. Accordingly, the film is exposed to such an object for a shorter period than an object which might have a dark background or have a dark characteristic. It is therefore, desirable, in order to obtain even reproductions, to control the timing of the exposure of the film. In order to render the old apparatus purely automatic, it is desirable to provide some means for advancing the film roll to present a new film section, as soon as an exposure has been completed. It is obvious that the advancing of the film into position cannot be constant, as the timing of the exposure of the film varies. Accordingly, it is one of the objects of the present invention to provide means whereby the film is automatically advanced, said means being controlled by and dependent upon the time of exposure of the film to the object to be reproduced.

Further objects and advantages of my invention will appear more fully hereinafter in the appended specification and claims.

For the purpose of disclosing the invention, I have illustrated an embodiment thereof, in the accompanying drawings, in which.

Figure 1:
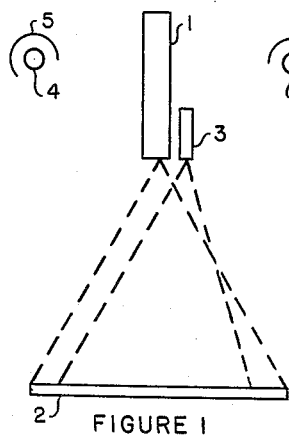
Fig. 1 is an end elevation (more or less diagrammatic) of a microfilm camera and its control mechanism.
Figure 2:
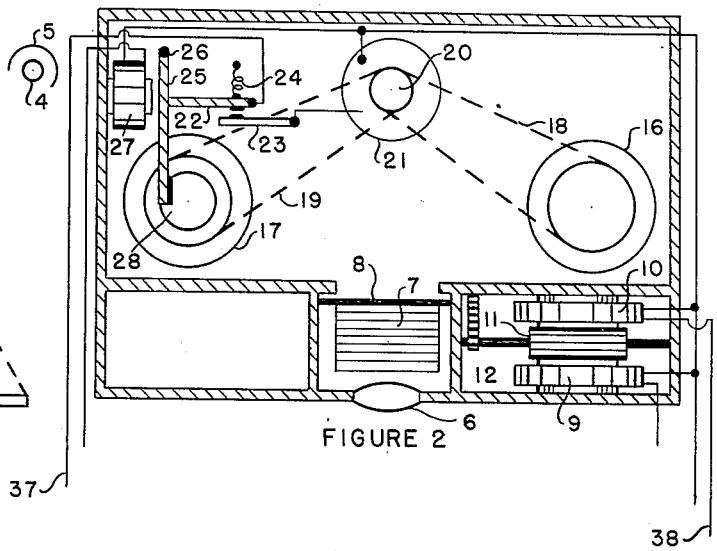
Fig. 2 is a longitudinal, section view (more or less diagrammatic) of the operating mechanism of the camera.
Figure 3:
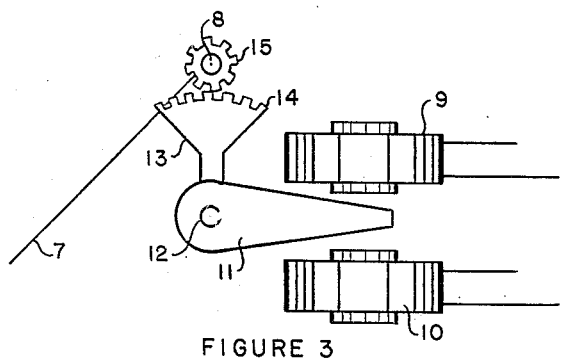
Fig. 3 is an end elevation of the operating mechanism for the camera shutter.

In the embodiment illustrated, having particular reference to Figs. 1 to 4, I provide a microfilm camera 1 suitably supported above the object 2 and alongside the camera, I preferably mount the timing control mechanism 3 so that the light reflected from the object beneath the camera to the timing control will be substantially the same as, if not identical with, that reflected into the lens of the camera. This timing control includes a casing having a small opening in its bottom through which the light reflected from the object is adapted to pass to influence the electric eye forming a part of the timing control. For the purpose of providing suitable illumination for the object, I preferably provide on each side of the camera illuminating lamps 4 having associated therewith suitable reflectors 5.

The camera 1 is provided with a suitable lens 6 through which the rays or light pass to impinge upon a film negative mounted within the camera. The admission of light through the lens and onto the negative is controlled by a shutter 7 pivoted to swing on a pivot support or shaft 8. This shutter 7 is adapted to be opened and closed through the medium of suitable electromagnets 9 and 10 between which is mounted an armature 11 carried on a suitable shaft 12, provided with an arm 13 having a rack 14 meshing with a pinion 15 mounted on the shaft 8 carrying the shutter so that as the shaft is rotated in one direction or the other, the shutter will be opened or closed.

The negative film is adapted to be wound from a supply spool 16 onto a receiving spool 17. These respective spools are driven by suitable belt drives 18 and 19 from a pulley 20 of an electric motor 21. The circuit of this electric motor is controlled by a switch including a switch arm 22 and a relatively stationary contact 23. The switch arm 22 is biased in an open position by suitable coil spring 24 and is carried by an arm 25 pivoted at 26. This arm 25 is moved in one direction against the bias of the spring 24 through the medium of an electromagnet 27. The lower end of the arm is adapted to ride on a cam 28 carried on the shaft of the reel 17, which cam has a low spot into which the end of the arm 25 is adapted to drop when the switch arm 25 is in its open position.

Figure 4:
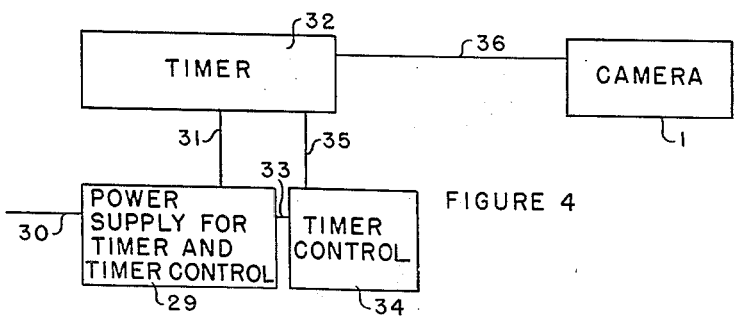
Fig. 4 is a diagrammatic view showing the association of the various control mechanisms.

In actual practice, I prefer to arrange the various control parts as separate units and in Fig. 4, I have illustrated a block diagram, showing the association of the various controls. In this diagram, the power supply unit 29 has a cable 30 connected with a suitable source of alternating current supply. From this power supply unit, a cable 31 extends to the timer unit 32 and likewise a cable 33 extends from the power supply unit to the timer control unit 34. There is also a cable connection 35 between the timer and the timer control unit with a cable connection 36 extending between the timer and the operating mechanism of the camera 1.

Figure 5:
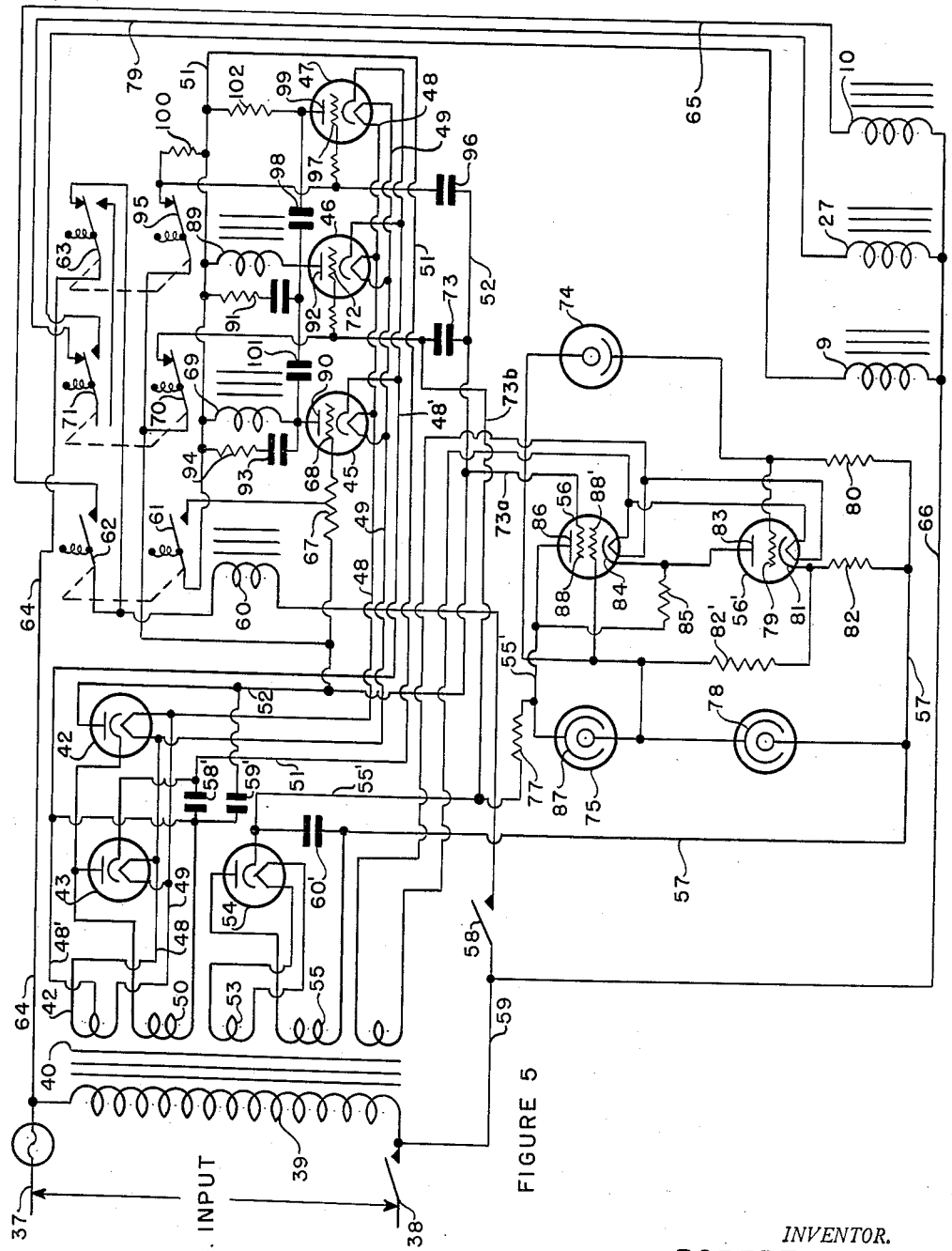
Fig. 5 is a diagrammatic view of the circuit arrangement of the operating mechanism and parts.

In Fig. 5, I have illustrated a diagrammatic view of a circuit arrangement of the various control elements and their circuit relation with one another, for controlling the operation of the different components of the camera. In the circuit arrangement shown, the two leads 37 and 38 which are adapted to be connected with any suitable alternating current supply, in the specific case a 115 volt alternating current supply, are connected to the opposite terminals of the primary winding 39 of a transformer 40 through suitable fuses and through a suitable manually operated control switch 41. A secondary winding 42 of the transformer supplies filament or heater power to rectifying tubes 43 and 44 as well as to the gas discharge tubes 45, 46 and 47, by conductors 48 and 49. A winding 50 of the transformer 40 supplies alternating current voltage to the rectifying tubes 43 and 44 which are arranged in a voltage doubler circuit and furnish, in the embodiment illustrated, 150 volt direct current power through conductors 51 and 52 to the gas triodes or tubes 45, 46 and 47 and furnishes negative bias (150 volt direct current) through conductors 52 and 48' for control of the grids on the triode tubes 45, 46 and 47. A winding 53 of the transformer 40 supplies filament power to a rectifier tube 54 and a winding 55 of the transformer 40 supplies alternating current voltage to the rectifier tube 54, which supplies through conductor 55' direct current plate power to a tube 56 which is connected in series with a tube 56'. The current return is through the conductor 57. The condensers 58', 59' and 60' are for the purpose of filtering the three direct current output voltages supplied to the timer circuits (the timer circuits will be more fully described hereinafter), the condenser 58' being connected across the conductors 48' and 51 and the condenser 59' being connected across the conductors 48' and 52 while the condenser 60' is connected across the conductors 55' and 57.

Action is initiated through the momentary closure of the manually operated switch 58 which completes the circuit from the lead or conductor 59 through the coil 60 of a relay controlling switches 61 and 62, through switch 63 back to lead 64. Hereafter reference will be made to the switches controlled by the relays having coils 60, 69 and 89. One position of these switches will be referred to as the operated position and the other position of the switches will be referred to as the released position. The term operated position is used to indicate the position of the switches when they are moved from the position illustrated in the drawings downwardly, under the influence of the relays having the coils 60, 69 and 89 and the term released position is used to indicate their normal or biased position or the position illustrated in the drawings.

With the switch 62 in closed position, the circuit from the alternating current power source to the solenoid 10 is completed by way of conductor 64 through the switches 62 and 63 and by the return conductor 66. At the same instant, switch 61 also closes the circuit between the positive lead 51 (+150 volt direct current with respect to conductor 48') through the resistor 67 to furnish positive bias on the grid 68 of the tube 45. The tube 45 passes current from its plate through the coil 69 of the electromagnet controlling the relay switches 70 and 71 to effect operation of these switches. The operation of the relay switch 71 initiates no action, since it is in series with the lower contact of switch 63 which has not yet been closed. Switch 70 in moving from its normal position disconnects the negative lead 52 (−150 volt direct current with respect to conductor 48') from the grid 72 of the gas triode tube 46, the grid 72 of this gas triode being connected through a condenser 73 to the negative bias lead 52.

The timer control amplifier circuit including tubes 56 and 56' supplies current to the condenser 73 allowing a charge to build up in this condenser 73. When this charge has become sufficiently built up, through its control of the gas triode tube 46 it effects the closure of the camera shutter 7, thus shutting off the exposure of the negative. Accordingly, the time it takes for the charge in the condenser 73 determines the length of time of the camera exposure and this build-up time is controlled by an electric eye tube 74 which is subjected to the light reflected from the image and is therefore responsive to the variations in said light. As has heretofore been explained, the timer is arranged in the timer casing 3 disposed beside the camera 1. The electric eye 74 and its associated timing elements is mounted in the casing 3 with the electric eye in such a position relative to a small opening in the bottom of the casing as to receive the light reflected from the object to be photographed, in the same manner as the camera lens receives the light. This is more particularly illustrated in Fig. 1. The photoelectric eye 74 is connected in an amplifier circuit which amplifies the current in the eye, resulting from the light falling on the screen of the eye, to a value sufficiently high to operate the timer mechanism and control the build-up of the charge in the condenser 73.

In this timer control circuit, two voltage control or regulator tubes 75 and 76 are connected in series with a resistor 77 across the conductors 51' and 55', and supply constant voltage to the amplifying circuit. The photoelectric tube 74 is connected between the positive terminal 78 of the regulator tube 76 and the control grid 79 of the amplifier tube 56'. The control grid 79 of this amplifier tube 56' is connected to conductor 57 through a resistor 80 of a value sufficient to create suitable variations in the voltage of the grid resulting from current flow from the photoelectric tube 74. The cathode 81 of the amplifier tube 56' is connected to conductor 57 through a resistor 82, which limits the current flow through the amplifier tube. The plate 83 of the amplifier tube 56' is connected to the cathode 84 of the amplifier tube 56. A resistor 82' is connected between the positive terminal 78 of the regulator tube 76 and the cathode 81 of the amplifier tube 56' to provide a bias of such value that the current passing through the amplifier tube 56', when no light is presented to the photoelectric eye 74, will be nearly zero. The plate 86 of the amplifier tube 56 is connected to the positive terminal 87 of the voltage regulator tube 75. The screen grid 88 of the amplifier tube 56 is connected through conductor 73a to the negative bias lead 52, which is connected to one side of the condenser 73. The grid 72 of gas triode 46 is connected to the other terminal of condenser 73 and also to the positive lead 55' through conductor 73b.

When the voltage across the condenser 73 has reached a point sufficiently high to start a current flow in the gas triode 46, current flow will be established through the relay winding 89. With the relay winding 89 energized, the switch 63 is moved to operated position and with switch 71 in operated position, a circuit is established through the electromagnet 9, thus moving the camera shutter to closed position. The current flow through the tube 46 drops the voltage at the plate 90 of the gas triode 45, due to a condenser 101 which is connected between the plate 92 of the tube 46 and the plate 90 of the tube 45, thus causing the tube 45 to cease conducting current through the winding 69, deenergizing the winding and permitting switches 70 and 71 to move back to normal or open position. A time delay circuit however, is provided to allow current to flow through relay coil 69 for a period of time after current flow ceases through the tube 45 and thus, for a short period of time, maintaining switch 71 closed for a sufficient length of time after the closure of the switch 63 to complete the movement of the shutter 7 to its closed position. Thus for a short interval of time the switch 71 controlled by the relay coil 69 and the switch 63 controlled by the relay coil 89 are both in closed position, allowing current flow from the conductor 66 through the solenoid 9, through the switch 63, through the switch 71, through the conductor 64 as above explained, maintaining the current flow through the winding 9 of the solenoid sufficiently long to complete the closure of the shutter.

The time delay in degeneration of relay coil 69 is accomplished by means of a condenser 93 and a resistor 94 in series, being connected across the relay coil 69. After current flow has ceased through gas triode 45, the discharge current from condenser 93 through resistor 94 keeps the relay coil 69 energized. The period during which the relay coil 69 is sufficiently energized to keep switches 70 and 71 in a closed position is dependent on the capacity of condenser 93, the resistor 94, the resistance of relay coil 69, and the charge which was present on condenser 93 at the instant current flow through the gas triode 45 ceased. The said values are pre-set to get the desired amount of delay time in the releasing of switches 70 and 71. This delay time is the time during which solenoid 9, controlling the closure of the camera shutter 7, remains energized.

Immediately after the closing of the shutter has taken place, the relay coil 69 becomes deenergized thereby releasing switches 70 and 71. The switch 71 completes a circuit from the conductor 64 through the lower contact of switch 63, through the switch 71, through the conductor 79 to the solenoid 27, which operates the switch 22 to close the circuit through the motor 21, driving the film take-up of the camera and thus moving the film one step to present a fresh film for photographic purposes. The motor wind-up is stopped when the cam wheel 28 permits the arm 25 of the motor control switch to drop onto the low side of the cam wheel, thus opening the switch 22. The circuit through the solenoid 27 is also shut off through the release of the switch 63 which is effected when the relay coil 89 is deenergized.

With the switch 95 released, that is with the coil 89 deenergized and switch 95 in its up position, a short circuit will be established around the condenser 96 and accordingly, the condenser will not be receiving a charge. During the time, however, when the relay coil 89 is energized, the switch 95 will be moved to its down position and as a result, the condenser 96 will be connected across the leads 51 and 52, and a charge will be built up in the condenser, due to the potential difference between leads 51 and 52. The control grid 97 of the tube 47 is connected to the condenser 96 and when the charge of the condenser 96 has been built up to reach a sufficient positive value to trigger the control grid 97, current flow will be established through the tube 47. With current flowing through tube 47, the voltage at the plate 92 of the tube 46 is lowered by means of a discharge through the condenser 98 which is connected between the plate 92 of the tube 46 and the plate 97 of the tube 47. As it is desirable to have a certain time delay in the deenergization of the relay coil 89, in which to permit the motor to complete its film take-up action, a resistor 100 is connected in series with the condenser 96. This time delay is for the purpose of allowing time for the switch arm 25 to ride out of the notch in cam 28.

With the camera shutter open, the light reflected from the object energizes the photoelectric eye 74, which in accordance with the well-known characteristic of this type of device, will permit current flow in proportion to the light impinging upon the screen of the eye and the current will flow between terminal 78 of the voltage control tube 76 and the grid 79 of the amplifier tube 56'. This current also passes through a resistor 80 and as a result, a voltage is set up across the resistor 80 and imposed upon the grid 79 of the amplifier tube 56', and current will then flow through the amplifier tube. The plate 83 of the amplifier tube 56' is connected to the cathode 84 of the amplifier tube 56. The high positive voltage present on the screen grid 88 of the amplifier tube 56 attracts the electrons from the cathode 84 of the amplifier tube 56 and the electrons are accelerated and pass through the aforesaid screen grid to impinge upon the plate 86 of the amplifier tube 56. The plate gives up electrons under the bombardment and these are attracted back to the screen grid 88 of the tube 56 and pass to the negative terminal of the condenser 73, building up a voltage across the condenser 73. When this voltage is built up to the critical point, the current flow will start through the gas triode 46 and through the relay coil 89, thus energizing the relay coil 89 which in turn operates the switches 63 and 95. Switch 63 allows alternating current power to pass from the line 66, thus closing the circuit of solenoid 9 through the upper contact of switch 71, through switch 63 to conductor 64. Upon closing of the shutter, no more light is allowed to strike the negative.

Immediately after the shutter has been closed by the solenoid operation, the current flow through relay coil 69, which has resulted from a charge on condenser 93, has decreased to the point where switches 70 and 71 controlled by relay coil 69 are allowed to release. Release of switch 71 allows current to flow from conductor 66 through coil 27, through switch 63, through switch 71, to conductor 64, thus starting the film wind-up motor.

Immediately after the solenoid 27 has been energized, the current flow through relay coil 89, resulting from a charge on condenser 91 has decreased to the point where switches 63 and 95 controlled by relay coil 89 are allowed to release. In opening the lower contact of switch 63, current flow is shut off from the solenoid coil 27. However, upon the starting of the motor, the arm 25 is mechanically held in position to the close the switch 22 through the medium of a cam driven with the film take-up by the motor. Therefore, the opening of the circuit through the solenoid 27 does not open the circuit of the motor until the cam 28 of the film take-up spool permits the arm 25 to drop into the lower portion of the cam. When this happens, the switch 22 controlling the operation of the motor is opened, permitting the motor to come to a rest. The inertia of the motor causes it to continue to turn for a period of time after the current flow through the motor is cut off. This coasting of the motor is prevented from turning up more film by the medium of a slip belt.

To further explain the action of the times circuit, at the instant that switch 95 is caused to open by current flow through the relay coil 89, the circuit from the negative conductor 52 through switch 95 to the grid of gas triode 47 is opened, thus removing a short circuit from around condenser 96. This allows a charge to build up across condenser 96, resulting from current flow through resistor 100 coming from the positive conductor 51. When the voltage across the condenser 96 has reached the critical point, it allows current flow through the gas triode 47 and through the resistor 102. The sudden change in voltage at the plate 99 of the gas triode 47 causes a charge of current to flow through condenser 98, dropping the voltage at the plate 92 of the gas triode 46, which allows the gas triode 46 to cease current flow. Thus, the relay coil 89 is deenergized, allowing for releasing of the switches 70 and 71. At this instant, the timer has completed its cycle and is ready for the starting of another cycle. The grid 68 of the gas triode 45, grid 72 of the gas triode 46 and the grid 97 of gas triode 47 are held at a negative potential by connections to conductor 52, which prevents start of current flow through any tube. The gas triode 47 at the end of the cycle is conducting current so that holding the grid at the negative potential does not effect the current flow in this tube. The purpose of gas triode 47, resistor 102 and condenser 98 are purely to quench the current flow in gas triode 46, in order to terminate the cycle. The tube 47 is quenched when tube 45 is re-energized to connect condensers 101 and 98 in shunt to the tube 47, and the charge on condenser 98 applies a negative voltage to the plate of tube 47 to de-energize this tube.

In operation, the color of the light sources and corespondingly, the color of the light reflected from the object vary under different conditions of operation. For instance, a change in voltage in the input line may affect the color characteristic or intensity of the lights 4—4. In order to compensate for this change, I provide a means for controlling the linearity of the amplifying tubes 56 and 46', which consists in properly selecting the characteristic of the tubes and associating with each of the tubes in the cathode circuit respectively resistances 82' and 85. These resistances are so selected as to cut down the response of the tubes 56 and 56' at low light values which effect the tube 74. By this arrangement, I am enabled to compensate for the difference in response to varying color values between the light responsive means 74 on the one hand and the negative on the other.

In order to obtain the above characteristics, in the specific embodiment of my invention illustrated, the tube 56' comprises a 6AC7 tube with the screen grid, the suppressor grid, and the plate tied together to obtain the characteristic of a sharp, cut off triode with the resistance 82 having a value of 2,000 ohms and a resistance 82' having the value of one megohm. Likewise, the tube 56 is a 6AC7 tube with the screen grid and the suppressor grid tied together to obtain the sharp characteristics of a triode and the resistor 85 has the value of one megohm.

Summarizing, the operation of the parts is as follows:

Closing the switch 58 closes the circuit through the coil 60 by way of switch 63. With the coil 60 energized, switches 62 and 61 are closed. The closing of switch 62 closes the circuit through the winding 10, by way of switch 63, which operates to move the shutter 7 to open position.

With the closing of switch 61, a circuit is closed to furnish a positive bias through resistance 67 to the grid 68 of the tube 45. This causes tube 45 to pass current through coil 69 energizing coil 69, thereby closing the lower contact of switch 71 and opening switch 70.

The opening of switch 70 disconnects the negative lead to the grid of tube 46 and permits condenser 73 to supply current to the grid of tube 46, when the condenser charge has been sufficiently built up. The building up of the charge in the condenser 73 from an amplifier circuit, including the tubes 75 and 76 and the tubes 56 and 46', is controlled by the tube 74 which in turn reacts in accordance with the light reflected.

When the charge is built up in the condenser 73 sufficiently, the grid of the tube 46 is energized and as a result, current passes through the tube 46, energizing the coil 89 and closing the lower contact of switch 63 and opening switch 95. With the lower contact of switch 63 closed, a circuit is established through the coil 9 by way of switches 63 and 71. This causes the shutter to start moving in a closed direction.

With the tube 46 operating, the current flow through this tube 46 drops the voltage at the plate 90 of the gas triode 45 and as a result, energizing current for the coil 69 would, under normal circumstances, cease to flow. However, in order to maintain the coil 69 energized, and thereby the switch 71 closed for a sufficient length of time, a sustaining circuit is established through the condenser 93 and the resistor 94 so that by the time the condenser 93 is discharged, thus deenergizing the coil 69, the shutter will have been moved to its closed position. With the deenergization of the coil 69, the lower contact of switch 71 controlling the circuit of the magnet 9 is opened and switch 70 closed. The opening of the lower contact of switch 71 opens the circuit of the shutter of the coil 9, thereby deenergizing the coil and the closing shutter movement comes to a stop.

The tube 46 is still passing current so that the coil 89 is energized and with the switch 71 in released position and the switch 63 in operated position, a circuit is established through the winding 27 which in turn will close the switch 22, thereby closing the circuit through the coil 28 to drive the film roll to present a new section of the film.

With the switch 95 open, it being remembered that the coil 89 is still energized, the condenser 96 will be building up a charge from positive conductor 51 and when this charge is sufficiently built up to trigger the grid of the tube 47, current flow will be established through the tube 47, causing a dropping of the voltage at the plate of the tube 46 through the condenser 98 which in turn drops the voltage at plate 92 of tube 46. With the dropping of this voltage, the coil 89 is deenergized, closing switch 95 and releasing switch 63 which in turn opens the circuit of the coil 27. This in turn releases the switch 22, opening the circuit of the motor 29 and stopping the winding of the film, leaving the apparatus in condition to repeat the cycle.

The present application is a division of my co-pending application for Automatic Exposure Timer for Cameras Serial No. 702,124, filed October 9, 1946.

I claim as my invention:

1. A system for operating the shutter and the film advancing means of a camera comprising, in combination, means for opening said shutter, electrically operated shutter closing means, first and second electromagnetic relays each having a pair of normally open contacts which close upon energization of the relay, an energizing circuit for said shutter closing means including the normally open contacts on both of said relays connected in series circuit relation, means operated simultaneously with operation of said shutter opening means for energizing said first relay, a time delay device controlled by said first relay upon energization thereof for energizing said second relay after a predetermined time delay, electrical means for operating said film advancing means, a circuit for energizing said film advancing means including a pair of normally closed contacts on said first relay and a pair of normally open contacts on said second relay, and means responsive to the energization of said second relay for de-energizing said first relay.

2. A system according to claim 1 and including time delay means controlled by said second relay in energized position for de-energizing said second relay after a predetermined time.

3. A system for operating the shutter and the film advancing means of a camera comprising, in combination, electrically operated shutter closing means, first and second electromagnetic relays each having a pair of normally open contacts which close upon energization of the relay, an energizing circuit for said shutter closing means including both pairs of said normally open contacts connected in series circuit relation, control means for energizing said first relay, a time delay device controlled by said first relay upon energization thereof for energizing said second relay after a predetermined time delay, electrical means for operating said film advancing means, and a circuit for energizing said film advancing means including a pair of normally closed contacts on said first relay and a pair of normally open contacts on said second relay, and means responsive to the energization of said second relay for de-energizing said first relay.

4. A system according to claim 3 and including time delay means controlled by said second relay in energized position for de-energizing said second relay after a predetermined time.

5. A system for operating the shutter and the film advancing means of a camera comprising, in combination, electrically operated shutter closing means, electrical means for operating said film advancing means, a relay, means including a normally open switch for energizing said relay upon closing of said switch, means for maintaining said relay energized independently of said switch, a circuit for energizing said shutter closing means including normally open contacts on said relay, time delay means rendered operative upon the energization of said relay for energizing said film advancing means, and second time delay means controlled by said relay in energized position for re-energizing said relay after a predetermined time.

6. A system for operating the film advancing means of a camera comprising, in combination, an electric motor for driving said film advancing means, an energizing circuit for said motor having a pair of normally open contacts therein, a relay having a movable armature arranged to close said contacts, means controlled by the operation of the motor for maintaining said contacts closed independently of said relay and for opening said contacts after said film advancing means has been operated through a predetermined extent, and time delay means rendered operative simultaneously upon energizing by said relay for de-energizing said relay after a predetermined time following energization of said motor and before said contacts have been opened by said film advancing means.

7. A system for operating the film advancing means of a camera comprising, in combination, an electric motor for driving said film advancing means, an energizing circuit for said motor, a relay for closing said circuit, means including a normally open switch for energizing said relay upon closing of said switch, means for maintaining said relay energized independently of said switch, time delay means rendered operative simultaneously upon energizing said relay for de-energizing said relay after a predetermined time, means controlled by the operation of said film advancing means and rendered effective before de-energization of said relay for maintaining said circuit energized after said relay is de-energized and for opening said circuit after said film advancing means has been operated through a predetermined extent.

ROBERT H. LEE.

REFERENCES CITED

The following references are of record in the file of this patent:

UNITED STATES PATENTS

| Number | Name | Date |
| --- | --- | --- |
| 1,939,243 | Twyman | Dec. 12, 1933 |
| 2,125,388 | Monroe | Aug. 2, 1938 |
| 2,160,390 | Pfannenstiehl | May 30, 1939 |
| 2,166,419 | O'Niell | July 18, 1939 |
| 2,166,440 | Jones | July 18, 1939 |
| 2,179,717 | Fedotoff | Nov. 14, 1939 |
| 2,227,987 | Tuttle et al. | Jan. 7, 1941 |
| 2,434,101 | Cann | Jan. 6, 1948 |
| 2,469,076 | Rabinowitz | May 3, 1949 |

FOREIGN PATENTS

| Number | Country | Date |
| --- | --- | --- |
| 553,949 | Great Britain | June 11, 1943 |